United States Patent [19]

Barrett

[11] Patent Number: 4,760,264
[45] Date of Patent: Jul. 26, 1988

[54] IRRADIATOR AND METHOD OF USING IRRADIATOR TO IRRADIATE

[76] Inventor: Lawrence G. Barrett, 3223 Downing Dr., Lynchburg, Va. 24503

[21] Appl. No.: 819,254

[22] Filed: Jan. 16, 1986

[51] Int. Cl.⁴ .............................................. A23L 3/26
[52] U.S. Cl. .......................... 250/453.1; 250/492.1;
250/505.1; 250/506.1; 198/801; 376/340;
376/342; 378/64
[58] Field of Search ............... 250/492.1, 505.1, 506.1,
250/515.1, 518.1, 522.1, 496.1, 497.1, 493.1,
453.1, 454.1, 455.1; 99/451; 198/801; 376/430,
432, 213, 333; 378/64

[56] References Cited

U.S. PATENT DOCUMENTS

| | | | |
|---|---|---|---|
| 1,735,610 | 11/1929 | Goodall et al. | 250/429 |
| 1,768,635 | 7/1930 | Schaffner | 250/453.1 |
| 1,856,084 | 5/1932 | Smith | 378/69 |
| 2,501,290 | 3/1950 | Pequingnot | 250/436 |
| 2,885,557 | 5/1959 | Kizaur | 328/58 |
| 2,943,203 | 6/1960 | Ritchey | 250/492.1 |
| 3,006,834 | 10/1961 | Loeb | 250/497.1 |
| 3,011,662 | 12/1961 | Daily | 328/52 |
| 3,057,735 | 10/1962 | Ottke et al. | 426/2 |
| 3,100,971 | 8/1963 | Morrison | 62/64 |
| 3,177,121 | 4/1965 | Horowitz et al. | 376/341 |
| 3,180,799 | 4/1965 | Blake | 376/213 |
| 3,213,280 | 10/1965 | Burley et al. | 250/391 |
| 3,360,646 | 12/1967 | Reiback et al. | 328/66 |
| 3,376,141 | 4/1968 | Delgado | 426/241 |
| 3,396,273 | 8/1968 | Brunner | 250/454.1 |
| 3,401,044 | 9/1968 | Corlett, Jr. et al. | 426/234 |
| 3,417,239 | 12/1968 | Blache-Fraser et al. | 250/453.1 |
| 3,434,850 | 3/1969 | Hoff | 426/240 |
| 3,437,495 | 4/1969 | Jeppson | 426/240 |
| 3,452,195 | 6/1969 | Brunner | 250/454.1 |
| 3,481,266 | 12/1969 | Puschner | 99/451 |
| 3,493,397 | 2/1970 | Shults | 426/234 |
| 3,519,817 | 7/1970 | Brunner | 250/436 |
| 3,527,940 | 9/1970 | Balanca et al. | 250/492.1 |
| 3,566,113 | 2/1971 | Balanca et al. | 250/497.1 |
| 3,567,462 | 3/1971 | Silverman et al. | 426/237 |
| 3,573,067 | 3/1971 | Shults | 426/234 |
| 3,592,658 | 7/1971 | Shults | 426/234 |
| 3,604,934 | 9/1971 | Melillo | 378/69 |
| 3,607,632 | 9/1971 | Hansen | 376/342 |
| 3,934,042 | 1/1976 | De Stoutz | 426/248 |
| 4,066,907 | 1/1978 | Tetzlaff | 378/69 |
| 4,172,019 | 8/1979 | Woodbridge | 422/22 |
| 4,175,140 | 11/1979 | Bachmann et al. | 426/399 |
| 4,218,486 | 8/1980 | Bieler et al. | 426/412 |
| 4,396,582 | 8/1983 | Kodera | 422/300 |
| 4,400,344 | 8/1983 | Wachter et al. | 250/506 |
| 4,431,737 | 2/1984 | Olivieri | 435/204 |

FOREIGN PATENT DOCUMENTS

| | | | |
|---|---|---|---|
| 0536486 | 1/1957 | Canada | 250/492.1 |
| 1181896 | 1/1959 | France | 198/801 |
| 1422270 | 11/1965 | France | 250/492.1 |
| 0921824 | 3/1963 | United Kingdom | 198/801 |
| 1230950 | 5/1971 | United Kingdom | |

OTHER PUBLICATIONS

U.S. Ser. No.909,221 filed 9/19/86 to Barrett.
U.S. Ser. No. 701,310 filed 2/13/85 to Barrett.
Article "Elements of Gamma Irradiator Design" —Manowitz, pp. 109–117, Nov. 9, 1965—Radiation Preservation of Foods.
Article "A Unique and Versatile Gamma Irradiator for Radiation Preservation of Food" —Welt, Journal of Food Safety, vol. 5, No. 1, (1983) pp. 229–241.

Primary Examiner—Bruce C. Anderson
Assistant Examiner—Paul A. Guss
Attorney, Agent, or Firm—Sandler & Greenblum

[57] ABSTRACT

An irradiator which can be incorporated within a packing house and a method of irradiating food in the packing house are disclosed. Food products are placed on spaced baskets and conveyed into an enclosure, through a irradiation chamber, and then outwardly from the enclosure. The food products are conveyed through tortuously arranged ductwork which serves to absorb radiation streaming upwardly. The radiation source is maintained underwater both during operation and shutdown, and no lifting of the radiation source is thus required. A portion of the conveyor is positioned within one or more casings and can be withdrawn, if necessary, to facilitate maintenance and repair.

53 Claims, 7 Drawing Sheets

IRRADIATOR AND METHOD OF USING IRRADIATOR TO IRRADIATE

BACKGROUND OF THE INVENTION

1. Field of the Invention

The present invention generally relates to an apparatus and a system for irradiating food, and more specifically to a conveying and irradiation system, and a method for using the same, which can be adapted for use in existing buildings such as food packing houses to irradiate food for purposes of, e.g., disinfestation of produce.

2. Discussion of Material and/or Information

Numerous methods are known for disinfesting food, the most well known of which is the spraying of food with disinfectants and a variety of other fumigants. These methods have become disfavored in recent years, however, due to possible injury to the food and consumers; perhaps the best example of this is the ban imposed by the U.S. Environmental Protection Agency against the use of ethylene dibromide fumigation techniques. Other fumigants have similarly been earmarked by regulatory agencies for restricted use (if any), and presently existing substitute treatment methods have been ineffectual or have impaired the quality of the food products treated.

Although the United States Food and Drug Administration (i.e., the FDA) has previously approved the use of radiation for disinfestation of certain types of food, it has recently approved the irradiation of pork as well as the irradiation disinfestation of produce at low doses of radiation, i.e., at dosages of radiation up to 100 kilorads. In addition, the FDA, prior to 1985, approved the use of irradiation for wheat flour and grain, and potatoes. Further, countries outside of the United States have used irradiation to disinfest food for even longer periods.

Presently, food manufacturers and packers can use the several service irradiation plants throughout the United States, which plants provide radiation services on a "pay as you go" toll basis to food production and packaging companies. Such toll may include, e.g., the salary of any U.S.D.A. or other inspectors who may be required.

None of the existing irradiators, however, are capable of being easily and relatively inexpensively integrated into present food production and packaging facilities. Thus, absent substantial additional expense, it is not presently possible for food production and packaging facilities and manufacturers to maintain complete quality control over their finished products via the use of in-house irradiators.

The present invention is designed to overcome the above defects and numerous other deficiencies in prior art irradiators, as well as to satisfy numerous needs of those in the food manufacturing and packaging/production industries.

Most conventional irradiators use storage pools for radioactive source materials when they are in their shutdown condition. These systems require an elaborate source raising system to lift radioactive cobalt-60 or cesium-137 source materials up from a pool to a cell located above the pool. In this fashion, the radioactive source is presented for irradiating products by using conveyor arrangements which are capable of carrying products through labyrinths which are positioned within concrete shielding walls around the cell, and then into close proximity to source materials. Such irradiator systems are disadvantageous because they require very heavy concrete shielding to completely enclose the source cell and the labyrinths which are used to convey materials into the cells. Such systems are referred to as "cell-type irradiators", and are capable of irradiating materials either in packages or in the form of fully loaded pallets. These systems are cumbersome and heavily shielded irradiators which require extremely heavy structural members to support the heavy shielded roofing system and cell members, both of which generally comprise substantial amounts of concrete.

These types of irradiators are also disadvantageous in that extremely complex interlocking systems are necessary to prevent inadvertent admission of personnel into the irradiation cell while the source material is being elevated into (or is already in place within) its irradiation position. As a result, these irradiators require personnel barriers and automatic shutdown devices positioned along the labyrinths to automatically move the radioactive source material back to the source storage pool whenever anyone enters the cell. Even in such cases, because of the complexity of such safety systems, the interlocks can be bypassed or become inoperative, and personnel may still enter the cells and become (dangerously) exposed to high radiation levels. For these reasons, operation of these conventional irradiators generally requires constant attendance by highly qualified operating personnel.

Yet another disadvantage of conventional irradiating apparatus is that the cell into which the radioactive sources are raised includes a large volume of air which is subject to constant irradiation; this results in a relatively high production of ozone and nitrogen oxides, all of which are gaseous in form and generally toxic to plant personnel. These gases can also cause damage to various materials located in the cells.

Many of these disadvantages are overcome by the present packing house food irradiator and system of irradiating food, e.g., the present system eliminates or minimizes the large amount of expensive concrete shielding and the use of a cell system found in prior systems, as it instead maintains its source materials within the pool both during normal operation and during shutdown conditions.

The present system permits the operation of food packaging conveyors and the irradiator by less skilled personnel than can operate present conveyors. The system also permits complete physical removal of moving parts of the conveying equipment for replacement or repair without the necessity of shutting down and draining the pool, as the conveyor system is maintained within its own casing. The ductwork used in the irradiation chambers of the present device provides for the circulation of air which can be at a controlled temperature in order to maintain a desired temperature for food products traversing this system. The air circulating through the conveyor can also be provided with a make-up supply in order to minimize, if not eliminate, the concentration and generation of ozone, gaseous nitrogen oxides, and other noxious fumes.

The present invention will also be capable of providing irradiation treatment to food products at a high (and easily controlled) throughput capacity and at substantially lower capital and operating costs than existing irradiation service plants which could be used to irradiate food. These existing plants have been designed to provide high dose irradiation sterilization of medical products and irradiation sufficient to pasteurize and sterilize other food products, such as fish and red meats. The present irradiator is a relatively small and low cost irradiator which can be directly used in the process line of a food manufacturer or packager after packaging of a given product is complete. An area on the order of only 250–400 square feet is necessary for positioning the present irradiator within an integrated food packing house.

OBJECTS OF THE INVENTION

It is accordingly a general object of the present invention to provide a new and improved food irradiator which is small enough to be easily and relatively inexpensively integrated into present food manufacturing and packaging processes and plants.

Another object of the present invention is to provide a new and improved food irradiator and process for irradiating food which can be used directly in a food processing and packaging line after a food product has been packaged.

Yet another object of the present invention is to provide a new and improved food irradiator and method of irradiating food which can be installed into present food manufacturing and packaging facilities at a low capital cost and at a low operational cost.

Yet a further object of the present invention is to provide a new and improved food irradiator and method for irradiating food which does not require any special handling and which can be integrated into present facilities.

Still a further object of the present invention is to provide a new and improved food irradiator and method of irradiating food which is safe for food packaging and processing personnel, both during operation and during performance of maintenance work on the irradiator; as well as safe for the food products irradiated.

Yet a still further object of the present invention is to provide a new and improved packing house irradiator and method for irradiating food which maintains the irradiation source materials in a pool and which does not require any lifting apparatus for lifting the source materials from the pool.

Another object of the present invention is to provide a new and improved packing house irradiator and method of irradiation which are capable of controlling the throughput rate of food product being irradiated in order to adjust the irradiation dose for the food, and which do not require as much expensive and heavy concrete or other shielding materials as do conventional irradiators.

Still a further object of the present invention is to provide a new and improved packing house food irradiator and method for irradiating food which avoids the production of corrosive and noxious gases and which, when complete, provides a food product output which is ready for palletizing and shipment.

Yet a further object of the present invention is to provide a new and improved packing house food irradiator and method of irradiating food which requires minimal personnel, both in numbers and skill, and which is capable of physically removing portions of the conveyor for food packages without shutting down the entire system and without requiring drainage of the pool in which the irradiating source is maintained.

A yet further object of the present invention is to provide a new and improved packing house irradiator and method of irradiating food products which are capable of controlling the temperature of the products and which minimize the production of ozone and gaseous nitrogen oxide, as well as limiting the concentration of such noxious gases.

Still another object of the present invention is to provide a new and improved packing house irradiator and method of irradiating food in which personnel are prevented from inadvertently becoming exposed to unacceptable levels of radiation, and who are continuously shielded while operating, inspecting, maintaining, and repairing the system.

Yet another object of the present invention is to provide a new and improved packing house food irradiator and method of irradiating food which are capable of accommodating a variety of carton and product sizes and irradiation dose levels.

The above and other objects, features and advantages of the present invention will be more fully described in the remainder of the specification and the accompanying drawings which follow.

SUMMARY OF THE INVENTION

As noted above, a packing house irradiator in accordance with the present invention will only need to occupy approximately 250–400 square feet of space in an existing facility. The irradiator system can have several alternate shapes, e.g., rectangular, and in one embodiment essentially comprises a cylindrical pool having a diameter of approximately 10 feet and a depth of about 25 feet which will be installed in (and substantially under) the floor of an existing packing house building. The pool is filled with water which is maintained at a high purity by conventional pool filtration, and in addition it will include a demineralizer. The top of the pool will be covered by a hemispherical dome; a water-tight conveyor system, which is described in greater detail hereinafter, is used to convey packaged products of a variety of dimensions through an opening in the dome, down through the pool of water and demineralizer, and ultimately to the radioactive source material which is maintained near the bottom of the pool. The system enables each package or carton of the product to receive at least a four-pass irradiation treatment, by virtue of its movement within the water-tight chamber of the conveyor, around the radioactive source material; thereafter, the food product is brought upwardly, via the conveyor, through another opening in the top of the dome. The dome serves as a personnel barrier to pool entry, as well as to prevent other materials from falling into the pool. The conveyor is capable of then transferring the food packages to automatic palletizers or to manual packaging stations. In this fashion, no special handling of the product is necessary in order to perform the irradiation, and it is not necessary for manufacturers to use an irradiating system outside of the packing house of the food processor.

It is believed that this system can be manufactured at a cost of about 20–40% of the cost required for conventional above grade, concrete-shielded irradiators. Low operating costs will result because there will be no need to have licensed irradiator operators on hand during operation of the device. Furthermore, it has been estimated that a typical irradiator formed in accordance with the present invention, having a throughput of 110,000 pounds/8 hours with a product requiring 30 kilorads of irradiation, will have an operating cost of less than $0.01 per pound. This cost includes an initial cobalt-60 source and replenishment of this source, and reflects significant operational cost savings for a food processor.

Irradiation in the present system does not require lifting of the source, but instead movement of the product conveyor and placement of products on the conveyor. When the conveyor stops for any reason, the radioactive sources in the present system will automatically be removed from their irradiation positions underwater, and all irradiation of any products still within the conveyor at any point along the conveyor will cease. All personnel are fully protected, by the adequate water and concrete shielding materials, from the irradiation source which is located at the bottom of the irradiator pool. Radioactive source materials are also transferred from shipping casks to the irradiator for operation via the pool.

When the products to be irradiated change, the present irradiator and method can be modified to handle different types of products changing the conveyor system or by adjusting the plaques which hold the radiation sources, insofar as the irradiation dose provided to the product is dependent upon the rate at which the product is moved through the irradiator. The amount of radiation dosage can be changed in several ways:

(a) the conveyor speed can be decreased in order to achieve a higher dosage level for products travelling through the irradiator; or (b) additional radioactive source material can be provided to increase the throughput level to a higher level to accommodate more irradiation of a greater amount of products (similarly, less material can be used to decrease the dosage, or the conveyor speed can be increased for the same reason); or (c) radiation source holding plaques can have their positions adjusted to provide variable source activity areas.

The present invention is provided for in a first aspect thereof by a packing house irradiator for irradiating food products at a desired radiation dosage levels. The irradiator comprises a substantially watertight enclosure which is adapted to be at least partially filled with water. An irradiation chamber is included for providing predetermined radiation dosages to food products moved through said chamber; the irradiation chamber is positioned underwater when the enclosure is filled with water, both during operation and shutdown of the irradiator.

A conveyor is provided for guiding food products into said enclosure, through said chamber, and outwardly from said enclosure; and a source of radiation is positionable within said irradiation chamber.

The irradiation chamber remains underwater both during operation and during shut-down of said irradiator, to minimize danger to operation personnel. The enclosure comprises at least one wall which is generally vertical, and can also comprise a substantially hemispherical dome which is attached to a top portion of the at least one generally vertically arranged wall, as well as a base attached to the bottom edge of said at least one wall. The wall(s) and the base define a watertight pool, with the base and a substantial portion of each said wall being adapted to be buried underground.

The wall can be substantially cylindrical, or can comprise four walls assembled in a generally rectangular fashion.

The base and the each said at least one wall are formed from concrete; and the dome includes at least one transparent observation port. At least one removable plug (and preferably four or more plugs) are provided in the base, each of said plugs closing a radiation source storage compartment located under said base which is adapted to hold at least one radiation source element.

The packing house irradiator further comprises at least one support for said irradiation chamber, each said support being securely connected to said pool base and to a bottom of said irradiation chamber to fixedly secure said chamber within said pool. A substantial portion of said pool is filled with water and a demineralizer.

The irradiation chamber includes a plurality of chamber sections, and the conveyor is located within said chamber sections. The irradiation chamber preferably includes five irradiation chamber sections, a central section for housing said radiation source, first and third sections comprising paths for guiding food downwardly within said chamber, and second and fourth sections comprising paths for guiding food products upwardly within said irradiation chamber. The second and third sections are located directly adjacent to said source, and each of the chamber sections is vertically arranged within said chamber.

The radiation source comprises at least one moveable plaque for holding radioactive material, and the radioactive material comprises a plurality of generally vertically arranged rods. If desired, there can be at least two plaques, and each of the plaques can comprise a plurality of non-radioactive spacer elements of low density material. When two plaques are used, means for moving the plaques with respect to each other are provided to adjust the position of the radioactive rods in each plaque with respect to each other, and to adjust the width (i.e., product coverage) and dosage presented by the radioactive material when the plaques are positioned within the irradiation chamber.

The irradiation chamber is positioned within approximately one-half of the pool area, said irradiator further comprising means for moving said plaque between said irradiation chamber into said pool; the irradiation chamber comprises two equal height chamber members defining an adjustable width slot between them for permitting each said plaque to be moved between said chamber and said pool. Means for oscillating the plaque vertically, horizontally, or in both directions can also be provided.

The conveyor is attached to ductwork which extends through said dome and into said pool, and the conveyor is attached to an interior surface of said irradiation chamber.

The ductwork extends from outside the dome to said irradiation chamber, and the conveyor is attached to an exterior surface of said ductwork and to an interior surface of said chamber. The ductwork is preferably watertight, and the conveyor comprises means for conducting a plurality of product holding baskets through said pool and said irradiation chamber. The baskets are spaced from each other, and each basket has a shaft extending outwardly therefrom. The conveyor comprises at least one continuous chain and means for attaching said chain to said basket shafts, and further comprises a generally rectangular casing which receives said shaft, and a roller wheel abutting opposed interior walls of said casing. The conveyor also comprises a plurality of spaced chain guides, each of said guides having a low coefficient of function and comprising a central recess within which said first roller chain is moveably positioned; as well as means for detecting the presence of an undesirable amount of liquid within said rectangular casing, said detecting means comprising flexible tubing fluidically connected to the interior of said casing and a pressure gauge connected to a free end of said tubing.

Ductwork is provided in a continuous fashion for connecting the exterior of said enclosure with said radiation chamber, said ductwork comprising a plurality of connected horizontal and vertical duct sections, a plurality of right-angled duct sections, and a plurality of twisted, generally vertically arranged duct sections, said ductwork comprising means for attenuating radiation from said radiation source.

The present invention is provided for in a second aspect thereof by a conveyor system for conveying food products through an irradiator, said conveyor system comprising a plurality of baskets with walls, each of said baskets having at least one shaft extending outwardly from one of said walls in a generally horizontal fashion, said system further comprising a first roller chain connected to said shafts, said roller chain being attached to a plurality of spaced chain guides with slots for moveably receiving said chain, said chain and said guides being independently removably positioned within a first generally rectangular casing. Each basket further comprises a second shaft extending outwardly from the one shaft, the second shaft being attached to a second rectangular casing which is substantially identical to said first casing. Each casing is adapted to be attached to a duct and to a radiation chamber, and the conveyor further comprises a second roller chain within each said casing, said first and second roller chains in each casing being independently moveable relative to each other. An additional shaft is positioned within each said casing, said additional shaft connecting said second chain to a roller wheel and to said guides, said roller wheel having a periphery which engages opposed inner walls of said casing. Each casing includes an elongated slot for receiving said basket shafts.

The conveyor system for conveying food products further comprises means for detecting leakage in said ductwork, said detecting means comprising flexible tubing fluidically connected at a first tubing end to a sealed volume between said casing and said ductwork and at a second tubing end to a pressure gauge.

The present invention is provided for in a third aspect thereof by a device for holding a plurality of rods of radioactive source material, said device comprising at least two plaques moveable with respect to each other, each of said plaques comprising a frame for holding a plurality of said rods in a generally vertical fashion. The plaques comprise at least one frame which includes at least two horizontal frame members with aligned openings for receiving source rods. Each plaque further comprises a plurality of non-radioactive, low density spacer elements; and each plaque can have at least two sections, one section retaining said rods and a second section retaining said spacer elements. Both of the plaques can have equal widths, and the rod sections in the plaques are offset from each other when the plaques are located adjacent to each other. The rod holding sections can be moved adjacent to each other when said plaques are moved. Means for moving the plaques, in the form of two parallel pairs of spaced tracks, can also be provided.

The present invention is provided for in a fourth aspect thereof by a method of irradiating food products in an irradiator with controlled dosages of radiation. The method comprises conveying said food products into an enclosure, then through watertight ductwork along a tortuous path, to an irradiation chamber located under water and within said enclosure; then at least two times past a source of radiation located within said chamber to expose said food products to direct radiation from said source, and thereafter from the chamber to the exterior of said enclosure and within the duct. The food products are placed into spaced baskets and using a motor driven first chain connected to said baskets for conveying said food products through said irradiator. A radiation source is selectively moved, in a generally horizontal fashion, between said radiation chamber and a pool of water which surrounds the chamber. If necessary, the method further comprises positioning radiation sources under the bottom of the enclosure for storage; and the method can comprise removing a second chain from a casing within which said motor driven chain and said second chain are positioned in order to remove otherwise stationary guides from the casing for maintenance and repair.

The radiation dose received by each of said food products can be controlled by changing the speed of conveyance of said food products through said enclosure.

The method can further comprise detecting the presence of leakage in said duct by reading a pressure gauge attached to one end of a flexible tubing which is attached at a second end to a sealed volume between said casing and said duct.

The food products are conveyed along a first horizontal path into an opening in said enclosure, then downwardly along a first vertical path towards said radiation source, then along a second horizontal path within said enclosure and above said radiation source, then vertically downwardly towards and into a chamber enclosing said radiation source. The food products are also moved past said radiation source within a radiation chamber along at least four paths, a first downwardly extending path, a second upwardly extending path directly adjacent to said radiation source, a third downwardly extending path directly adjacent to said radiation source, and a fourth, upwardly extending path; and the food products are thereafter conducted away from said fourth path along a vertically twisting path, then across said enclosure along a horizontal path, then upwardly towards an exit opening in a cover for said enclosure, then outwardly from said enclosure along a substantially horizontal path.

If desired, a plurality of radiation absorbing spacer elements are placed in the first group of baskets to be irradiated when said baskets are conveyed through said enclosure.

The radiation dose received by each of the food products can be controlled by the relative position of at least two radiation source holding plaques.

BRIEF DESCRIPTION OF THE DRAWINGS

The above and other features, objects and advantages of the present invention are fully disclosed in the accompanying specification and attached drawings, in which like reference numerals are used to illustrate similar parts throughout, and wherein:

FIG. 5a is a sectional view of the basket, pin and roller assembly, together with the casing for guiding movement of the basket, used in the packing house irradiator of FIG. 1;

FIG. 5b is a side view of one guide segment for the first roller chain of FIG. 5a;

DETAILED DESCRIPTION OF THE DRAWINGS

Figure 1:
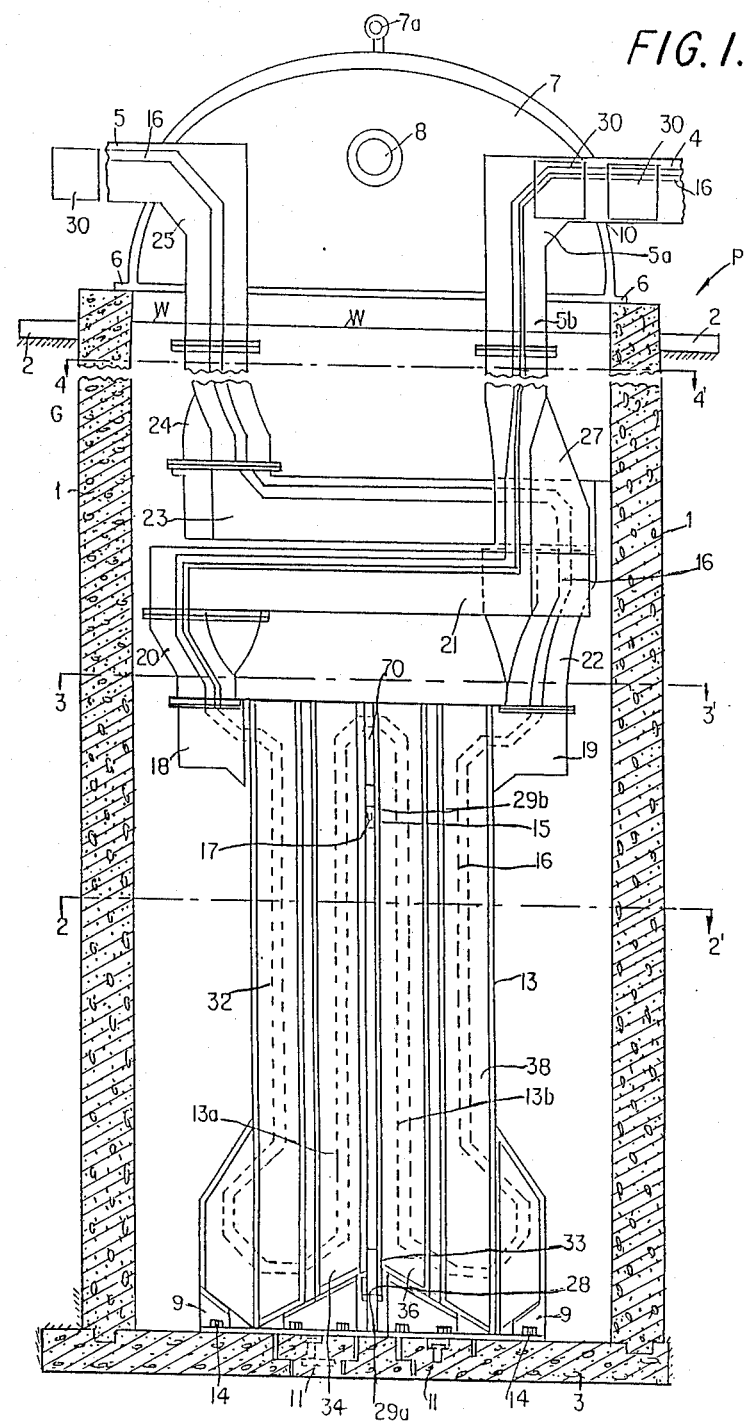
FIG. 1 is a cross-sectional view of a packing house irradiator formed in accordance with the present invention.
Figure 8:
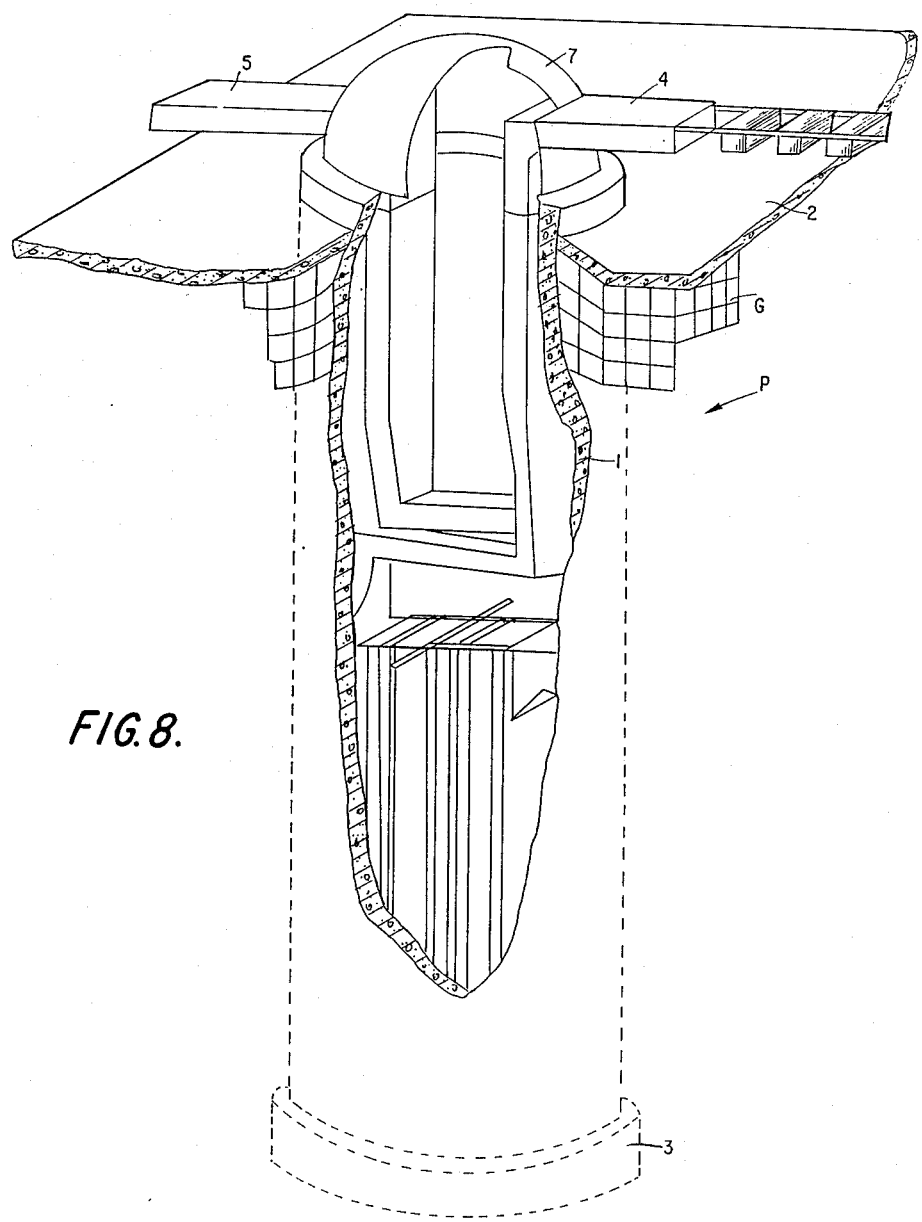
FIG. 8 is a perspective view of the irradiator of FIG. 1.

Referring more specifically to the drawings, FIG. 1 is a sectional view of the overall packing house irradiator P formed in accordance with the present invention. The packing house irradiator P includes a pool having a wall(s) 1, as best illustrated in FIGS. 1 and 8. A substantial portion of the walls are buried under ground G, beneath packing house floor 2. The wall(s) can be formed in a generally cylindrical fashion, particularly when used in smaller packing house irradiators. It may be necessary, however, to form the walls in a rectangular fashion for larger pools which require additional traversing and source mechanisms. The particular configuration of the pool, however, is not critical with respect to the present invention. Although the pool walls are illustrated as being formed from concrete, they could also be formed from fiberglass or other materials having similar structural characteristics. A stainless steel liner (not illustrated) could be used to line the interior surface of the concrete and would be necessary only where high radiation dosages are being used to irradiate a product, e.g., where large cobalt-60 or cesium-137 radioactive source material is being used. The base 3 of the pool is formed, in any event, from high density concrete material. It is necessary to use such concrete in order to adequately shield personnel and the rest of the enclosure from the stored radioactive materials, which can be placed below the upper surface of pool bottom 3, under shielding plugs 11, which are discussed in greater detail hereinafter.

When not in operation, e.g., during repair, the radioactive source materials can be retained in stainless steel canisters located beneath the removable plugs 11 in bottom 3 of pool 1. In this fashion, irradiator personnel will be able to enter the pool while it is being drained to maintain and repair the interior of the pool without worrying about the deleterious effects of radiation on packing house personnel. Plugs 11 include lifting eyelets 11a to assist in removing the plugs from base 3.

A dome-like cover 7, with a lifting eyelet 7a, is provided which is attached to the upper surfaces of pool walls 1 by suitable fastening elements 6, e.g., bolts. One or more transparent observation ports or windows 8 can be provided in the dome so that personnel can visually inspect the condition of pool water and the status of the system within the irradiator and pool without entering the same. The pool defined by wall(s) 1 and base 3 is watertight. Entry to and exit from the system is only via the ductwork as shown in FIGS. 1 and 8, with entry ductwork 4 and exit ductwork 5 being located on opposite sides of dome 7. A plurality of baskets 30 are supported by roller chains 42 along opposed walls which are positioned within tube or casing 16 (which is discussed in greater detail hereinafter). Each casing 16 is fastened to the exterior of the duct work when outside of the irradiation chamber 13, and is fastened to the interior of chamber 13, as illustrated by the dotted lines of FIG. 1.

The baskets 30 are themselves sized so as to accommodate one or more cartons containing the product to be irradiated, and will vary in size dependent upon the product to be irradiated. For example, large baskets will be necessary to carry packaged pork carcasses, and smaller baskets for carrying individual packaged chickens. FIG. 1 illustrates a plurality of baskets 30 entering entry ductwork 4 through an opening 10 in dome 7. Ductwork 4, to which casing 16 is attached, enters the dome in a substantially horizontal fashion, and then includes a downwardly inclined, right-angled portion 5a; it then extends into a vertically downwardly directed ductwork portion 5b, which enters the pool of water W, where it is joined to a twisted downwardly extending vertical portion duct 27. The twisted duct portion helps to attenuate gamma rays streaming upwardly towards the ductwork from the irradiator which is positioned beneath the dome; and is twisted to prevent mechanical interference with the remaining ductwork located above the irradiation chamber. This is necessary to minimize the amount of radiation from the irradiator system which will exist at any level above packing house floor 2. The ductwork continues along a horizontal section 21 located above the irradiation chamber 13, which extends leftwardly as viewed in FIG. 1; thereafter, the duct work continues downwardly through a second vertically twisted duct section 20, which is submerged beneath water W and which extends downwardly until it joins a connecting duct 18 which connects duct section 20 to a plurality of chamber paths/sections located within irradiation chamber 13. The purpose of having the ductwork take the tortuous vertical and horizontal path which is noted above is to provide for attenuation of gamma rays streaming upwardly from irradiation chamber 13, and to prevent mechanical interference. The attenuation results from the horizontal path traversed by duct section 21, as well as the attenuation which results from the presence of twisted vertical ductwork sections 20 and 27, which provides greater attenuation any radiation streaming upwardly. To reduce the albedo effect, lead can be strategically placed along exterior portions (such as corners) of the ductwork.

Each conduit/casing 16 is located within all of the above ductwork and then continues through at least four distinct pathways or sections of irradiation chamber 13. Although four paths are expressly disclosed, more paths could be provided to obtain greater efficiency in utilizing the radiation source. The number of paths provided will be limited by the pool size. The irradiation chamber can be considered as four sections, i.e., first irradiation chamber section 32, second irradiation chamber section 34, third irradiation chamber section 36, and fourth irradiation chamber section 38. Each conveyor casing or chain conveyor guide 16 follows a path through the first, second, third and fourth irradiation chamber sections; each casing 16 extends downwardly (with a slight bend at the lower portion of its downward extent) through first irradiation chamber section 32, where it reverses direction over 180° to bring it upwardly through the second path or second irradiation chamber section 34. During the downward pass any basket of material moving along the casing will receive a relatively low dose of irradiation from irradiation source plaque 15, which is located in central chamber section 33, as it is located further from the source than when it travels through the second and third sections 34 and 36, respectively, which are located on opposite sides directly adjacent to the source 15. After each conveyor casing 16 turns upwardly in second irradiation chamber section 34, it then extends downwardly through a third irradiation chamber section 36, where it again undergoes a 180° reversal before again coming back upwardly through fourth irradiation chamber section 38. Again, while the baskets are passing through the third section they will receive a greater dose of irradiation than when they move through the fourth section, which is located further from source plaque 15 than the third irradiation chamber section 36.

After leaving chamber 13, each conveyor 16 extends back into the ductwork via an angled duct work connecting portion 19, which connects the irradiation chamber 13 with the remainder of the existing ductwork. Conveyor casing 16 thereafter continues along the exterior surface of a vertically twisted ductwork section 22, along a horizontal ductwork section 23, and then back upwardly along a vertically arranged twisted ductwork section 24. Each conveyor casing then extends, above the level of pool water, along the exterior surface of a generally right-angled ductwork section 25. This right-angled section joins vertically arranged twisted duct work section 24 and exit ductwork section 5.

Irradiation chamber 13 is attached to pool bottom 3 by one or more a "saddle" type supports 9, which are securely bolted to the bottom of the pool 3 by conventional fastening elements, e.g., bolts 14. This saddle type support arrangement then is secured to the bottom of irradiation chamber 13 by welding or other conventional methods. The system must be secured to the floor of the pool because of the high buoyancy factor of both the ductwork and the irradiation chamber; it is therefore necessary to attach the system to the pool floor to prevent any tendency of the system to float.

Figure 2:
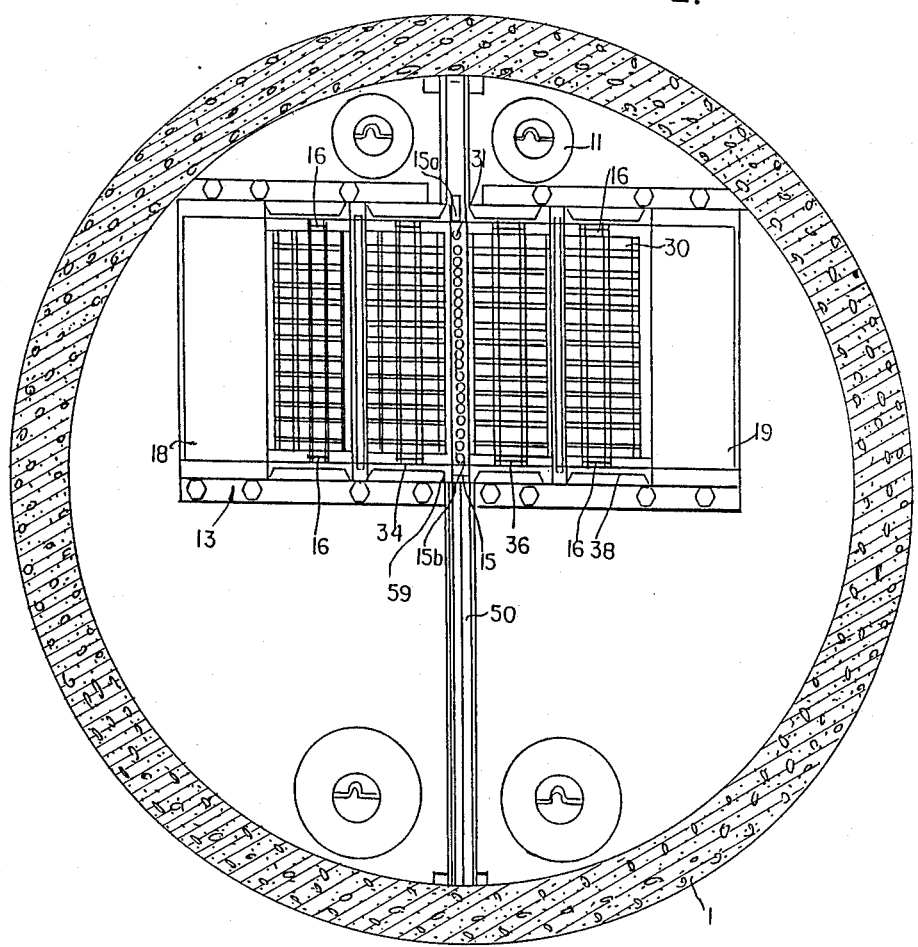
FIG. 2 is a sectional view of the packing house irradiator taken along line 2—2' of FIG. 1.
Figure 3:
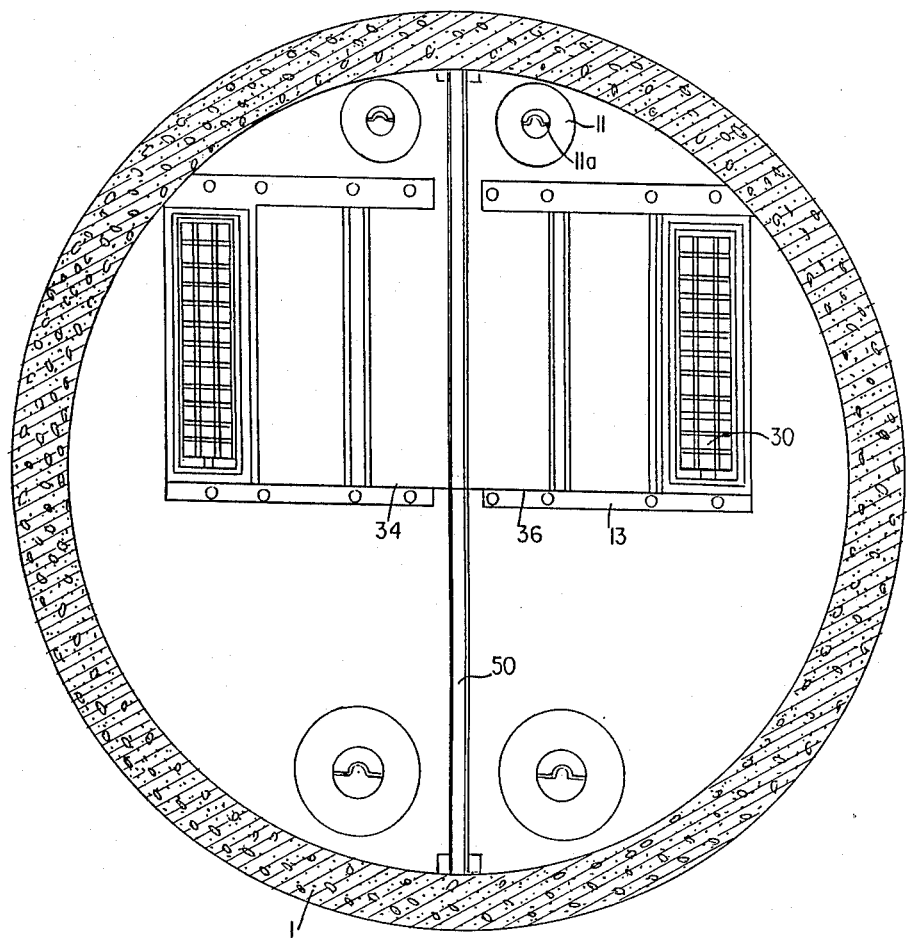
FIG. 3 is a sectional view of the packing house irradiator of FIG. 1 taken along line 3—3' of FIG. 1.
Figure 4:
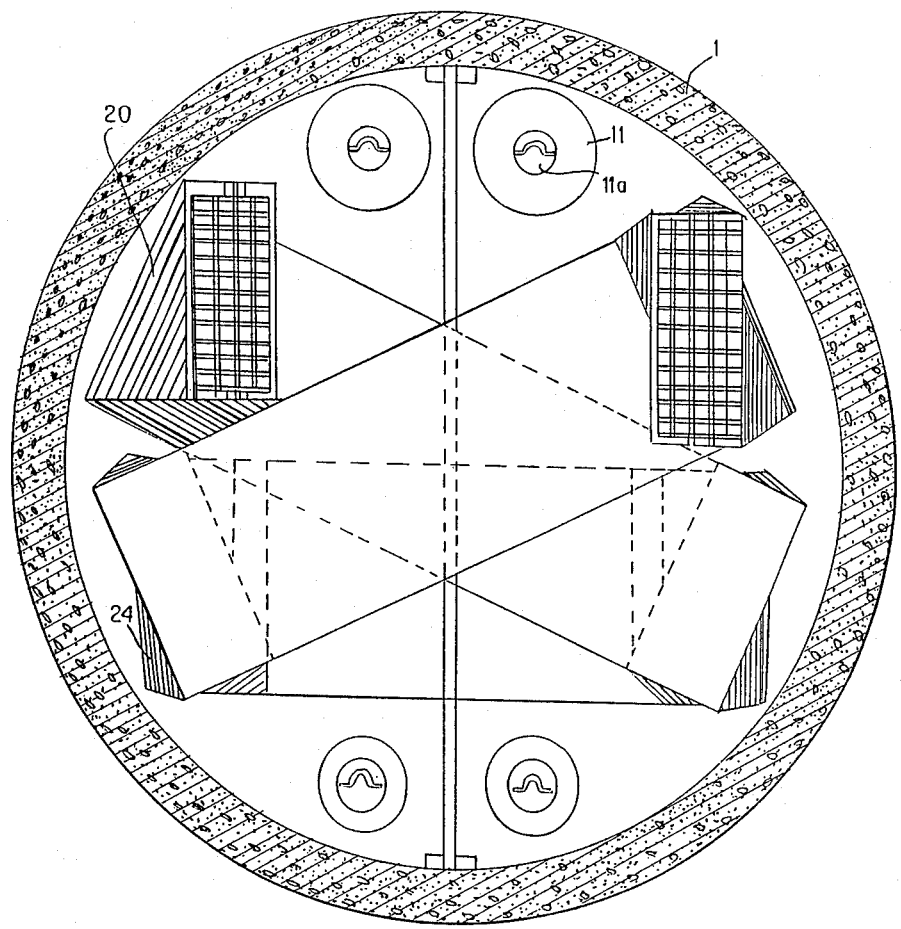
FIG. 4 is a sectional view of the packing house irradiator of FIG. 1 taken along line 4—4' of FIG. 1.

FIGS. 2, 3 and 4 illustrate the position of baskets 30 within the irradiator: in FIG. 2, all of the baskets are shown in respective irradiation chamber sections 32, 34, 36, and 38; in FIG. 3, baskets 30 are shown in respective ductwork sections 18 and 19; and in FIG. 4, the baskets are shown in respective upper duct sections such as 5a and 25. FIG. 2 clearly illustrates casings 16 which are located along opposite chamber section walls (internally). They are similarly positioned along the exterior of opposite ductwork walls.

Casings 16 are continuous and form a chain conveyor raceway guide which is external to the ductwork except when in the irradiator chamber 13. A dotted line has been placed in FIG. 1 to illustrate the approximate point at which conveyor casings 16 must be attached to the interior of the chamber rather than the exterior of the ductwork; this occurs approximately at the point wheren the irradiation chamber meets the ductwork. In the lower portion of the system, where the irradiation chamber is located and conveyor casings 16 are positioned along the interior of the chamber, the chamber sections must be of a sufficient size so as to accommodate the two opposed raceway guide casings 16.

Figures 5A, 5B:
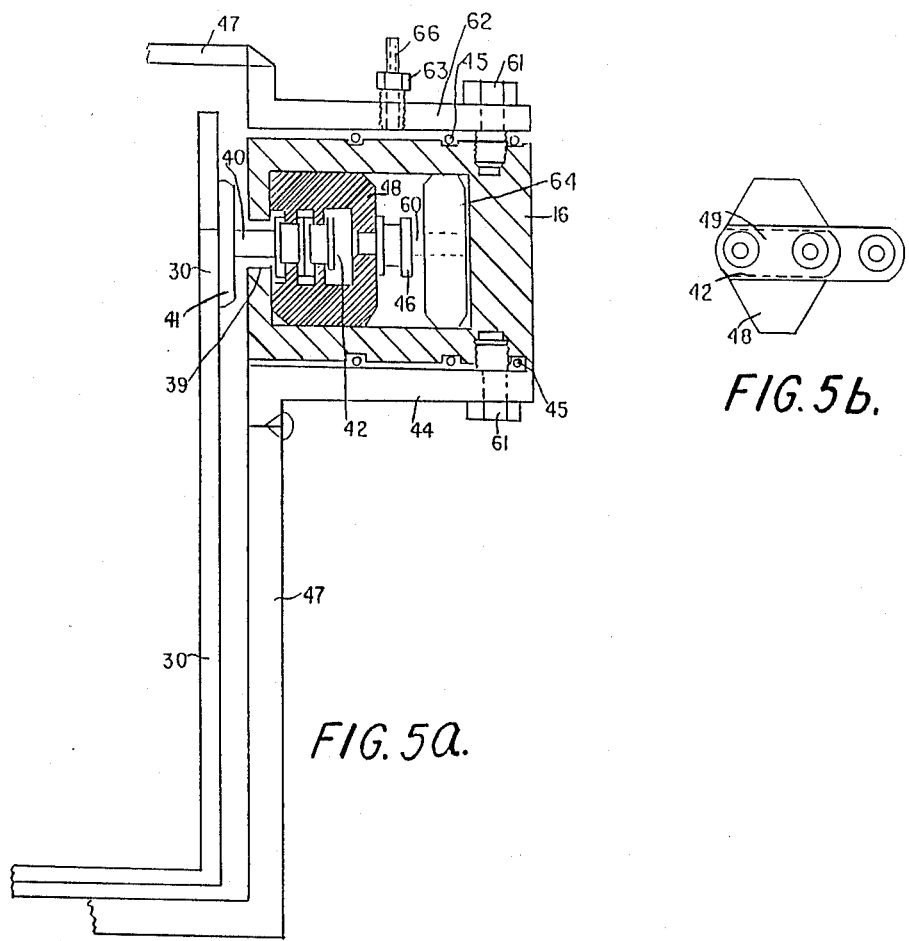

FIGS. 5a and 5b best illustrate the system which is used to convey the basket through the ductwork and the irradiation chamber 13. As best illustrated in these Figs., a roller chain system is used to convey the baskets through the ductwork and chamber. Identical systems are provided along opposed basket walls, but only one will be described to facilitate consideration herein. A first roller chain 42 is provided to move within tubular casing 16. Although a single or triple roller chain could be used, FIG. 5a illustrates a double chain roller unit having shafts 40 which extend outwardly from the baskets to the roller chains; the shafts engage bushings 41 located along the exterior surface of baskets 30. Shafts 40 are fully enclosed by the roller chains, the bushing and the basket wall (unreferenced) itself during operation. The shaft extends outwardly from casing opening 39, which comprises a continuous elongated slot, so that it will be engaged by busing 41, as seen in FIG. 5a. First roller chain 42 is adapted to roll over chain guides 48, one of which is illustrated in FIG. 5b. The guides can be formed from, e.g., either nylon or other low-friction material which exhibits high resistance to radiation. The guides include a horizontal slot 49 for moveably receiving one or more links of chain 42.

It is important in the present irradiation system to carefully select the material used for all of the components, as well as the material used to lubricate any necessary parts, in order to avoid deleterious effects when they are subjected to radiation, e.g., decomposition or embrittlement. When operational, chain 42 is continuous and extends upwardly and outwardly from inlet 4 and outlet 5 to loading and unloading stations, respectively. The chain is joined in an endless fashion through these stations and the irradiator 1 so that there will be a continuous chain which is moved by, e.g., conventional sprockets and drive motors (not shown). Because the sprockets and drive motors do not form part of the present invention, they have not been illustrated herein, but are conventional elements which are well known to those of ordinary skill in the art.

Shaft 40, bushings 41, first roller chain 42 and chain guides 48 form a conveying system which is capable of conveying baskets to the irradiator, through the ductwork, past the irradiation source, and outwardly from the enclosure.

Additional structure is provided, however, to enable operating personnel to remove the chain guides for inspection, repair or part replacement when necessary. This could not be achieved if chain guides 48 remained in position within conveyor guide casings 16. To this end, a second roller chain 46 is attached to each chain guide member 48 along the entire conveyor system within the ductwork and the irradiation chamber. This chain 46 can be moved independently of the basket drive roller chain 42 in order to move chain guides 48 into and out of the casing 16 to inspect the guides along the exterior of the system and to repair or replace all necessary parts. A roller wheel 64, which engages opposed interior surfaces of casing 16, is used to facilitate movement of second chain 46.

Duct members 47 are attached to casings 16 via conventional fastening elements to first and second angled ductwork members 62 and 44. Each conveyor casing or guide 16 has two major functions. First, it provides means for supporting and conveying the roller chain assembly; and it joins two adjacent sections of the conveyor ductwork so as to produce a water-tight system, as shown in FIG. 5a. It also permits the system to be taken apart for repairs and further maintenance in the event that damage occurs to the system for any reason, e.g., when a package becomes jammed within the conveyor ductwork or in the irradiation chamber.

Aluminum rods 45 or other similar radiation resistant O-ring type material are positioned in grooves (unreferenced) on the exterior of casings 16 so that they will be placed under compression when bolts 61 are used to tighten the angled duct members 62 and 44 against casing 16. In this fashion, the O-rings will serve to seal the casing and prevent water from entering the ductwork. At least two aluminum rods 45 are provided to serve as a double seal and to maintain the water-tightness of the apparatus during continuous operation, as well as to define a sealed volume between the duct and the casing.

However, in the event that, under prolonged usage over time, vibration of the system causes leaks to occur, it will be necessary to monitor such leaks. Although it is necessary to monitor leaks, such leaks can be tolerated for a short period of time until water reaches the product as it is conveyed through the ductwork. In order to monitor the waterproof nature or leak tightness of the apparatus, tubing is connected to both of ductwork angles 44 and 62, as illustrated in FIG. 5a. Flexible tubing 66 is positioned between the two adjacent aluminum rods where are closest to the ductwork interior. Fitting 63 is attached to the ductwork angle 62 and is sealed. Tubing fitting 63 and flexible tubing 66 extend along the ducts and up through the pool to a monitoring panel or pressure gauge (not illustrated). Nitrogen or other inert gas is applied to the tubing at all times at a known pressure, so that when a leak occurs a drop in pressure will occur due to the presence of liquid, and the leaking section can be properly identified and repaired when the leak (i.e., the pressure drop) is sufficiently large.

Plugs 11, which are positioned along bottom 3 of the pool, are provided with lifting eyelets 11a so that the concrete shielding plugs can be removed from floor 3. When removed, radiation source-containing canisters can be inserted into compartments below the plugs. This can be used to shield personnel doing repair work in the drained pool.

The radiation source structure is best illustrated in FIGS. 1 and 2. It includes a support 29a positioned at the bottom of the pool under the source plaque 15; this support can serve as a track for horizontal movement across the diameter of the pool (see FIGS. 2 and 3). The source plaque itself comprises an array of radioactive source elements which are properly encapsulated in order to minimize corrosion and prevent leakage of radioactive source material into water W of the pool. A lower frame member 28 and an upper frame member 17 for the source plaque are provided, as illustrated in FIG. 1. Both of these frame members are substantially horizontal, and the source elements themselves are positioned in one or more substantially vertical arrays, with their ends being retained within opposed recesses in secondary frame members of the arrays. Lower frame 28 slides within track 29a, and upper frame 17 within track 29b. The slidable connection between the frame and track can be, e.g., a tongue and groove or a ball and socket type.

Source plaque 15 is capable of moving along a line which crosses a complete diameter of pool 1, as illustrated by track 50 in FIGS. 2 and 3. The source plaque can be moved outwardly into the open area of the pool and then can be loaded with radioactive source elements or unloaded to position the elements into transfer casks. The source plaque moves outwardly from chamber slot 59, which equals the spacing between discrete irradiation chamber members 13a and 13b (see FIG. 1). The chamber members are both separated and joined by spacer 70; the spacer comprises a ring connecting the two members. In order to accommodate different diameter radioactive sources, spacers of different thicknesses can be used for this purpose.

Another advantage of the packing house irradiator P exists because the source plaque can be moved outwardly from the irradiator chamber whenever the conveyor is stopped. The source plaque can be moved across the diameter of the pool, in and out of the irradiation chamber, by a number of conventional mechanical conveying elements (not illustrated. These elements can include, e.g., cables positioned on trolleys or pneumatic cylinders which can be positioned so as to effect horizontal motion of the plaque and the enclosed radiation cylinders along horizontal tracks.

With irradiator designs requiring only a few radioactive source elements, it is possible to develop "hotspots" in the radiation dose distribution. To overcome this undesirable effect, it is possible to horizontally oscillate the source plaque through an amplitude of a few inches in a conventional pneumatic or mechanical fashion.

When it is necessary to start operation of the conveyor and then feed products through the irradiator, in order to ensure that the product will receive uniform irradiation dosages in accordance with the irradiation distribution which exists when the irradiation chamber is fully loaded, it becomes necessary to provide dummy materials to be placed into the first several baskets to fill the irradiation chamber; and to permit the baskets to pass through the irradiation chamber 13 ahead of the products which will be irradiated in baskets 30.

It is necessary to use such dummy materials in order to properly attenuate the gamma rays in the irradiation chamber in all of the pass configurations, so that the first basket containing actual food products to be irradiated which enters the irradiation chamber 13 will receive the same radiation dose when it traverses the irradiator source as if it had been fully loaded with products in position ahead of it on the conveyor line. This is necessary to assure that all desired irradiated products receive the same radiation dose and to minimize the need to disqualify material which may be improperly irradiated.

Once the irradiator becomes operational, food product will continue to fill the entire irradiation chamber, and as long as products are continuously fed at the same rate through the chamber, each basket containing food product will receive the same irradiation dose distribution as it traverses the chamber. If the conveyor stops for any reason, it is necessary not to overirradiate materials which are already positioned within the irradiation chamber. This can be easily accomplished by building in safety systems which will operate off of the same power supply as the conveyor, or which can be checked to determine when the conveyor is not moving. If a conveyor ever stops it would then cause fail-safe operation of the mechanical system, driving the plaque(s) into a horizontal position to stow it (them) away from its (their) irradiation chamber position(s). This allows the product to remain in the irradiation chamber until any problem has been solved without being unduly exposed to radiation. When operation starts again, the source plaque is quickly moved back, in a horizontal fashion, into the irradiation position. Further, to minimize extraneous radiation back into the irradiation chamber when the plaque is moved outwardly from the chamber, it may be necessary to add lead shielding (not shown) to the outside of the irradiation chamber wall in close proximity to the chamber slot 59 through which the source plaque moves. Accordingly, when the plaque moves outwardly from the irradiation chamber, it will have sufficient shielding on the walls adjacent to the chamber to minimize stray radiation from reaching the product which remains in the irradiation chamber when the product conveyor is not operating.

The present irradiator concept is advantageous in that it involves the operation of an irradiator in a fully submerged condition. Normally, when using cobalt-60 or cesium-137 radioactive source materials (as opposed to an irradiator cell-type facility), it would not be desireable to operate such an irradiator in a fully submerged condition because water tends to fill the spaces between the source elements themselves, as well as to provide water gaps between source elements and target materials. This results in higher parasitic absorption of gamma rays in the water gaps and in the spaces between elements within the source plaque.

Figure 6:
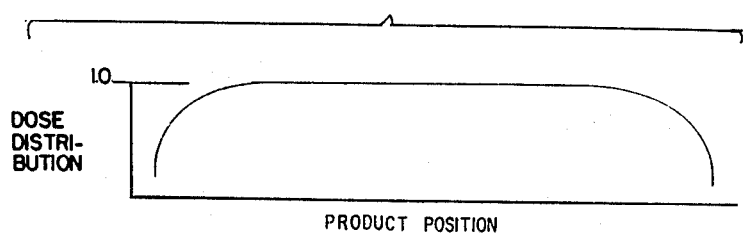
FIG. 6 is a sectional view of a two plaque arrangement for source elements used in the irradiator in FIG. 1.
Figure 7A:
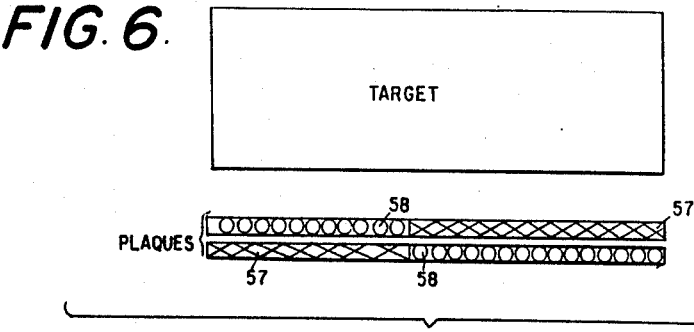
FIG. 7a illustrates an alternate position for the two plaque system of FIG. 6.
Figure 7A:
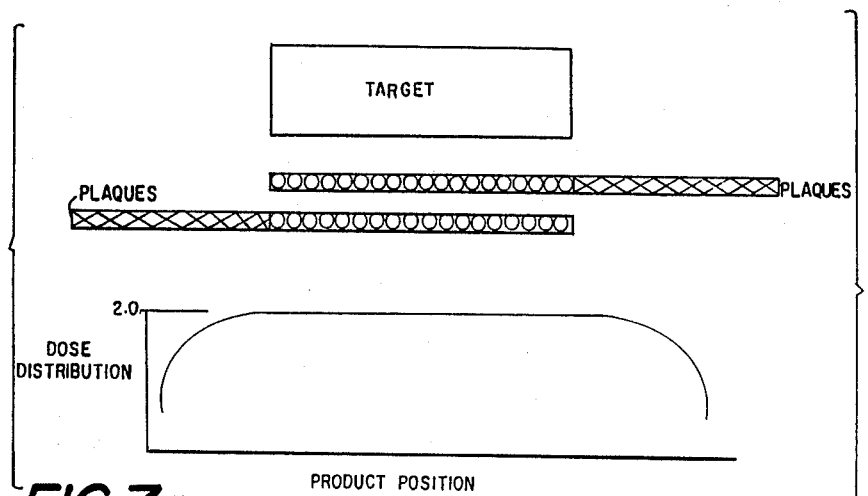
Figure 7B:
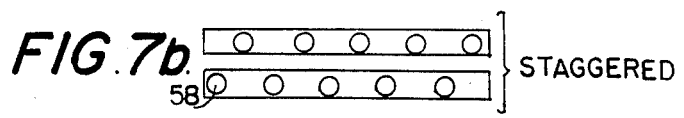
FIG. 7b illustrates the arrangement of a two plaque source system, in cross-section, having staggered radioactive rods.

In order to overcome this disadvantage, as shown in FIGS. 6, 7a, and 7b, the present invention can use dummy type source elements and spacers comprising low density materials with a specific gravity less than 1.0 in order to minimize absorption within the source plaque. The dummy materials can comprise, e.g., hollow tubes 57 having a variety of cross-sectional configurations which have been sealed and which may contain low density materials which are not subject to irradiation damage; they may even include, e.g., helium gas. As illustrated in FIGS. 6 and 7a, the source elements are generally held within one more racks positioned between horizontal frame members 17 and 29 and vertical frame members 15a and 15b of the plaque. The racks are sufficiently heavy to overcome any bouyancy effect which might exist due to the use of spacers or dummy elements.

FIG. 6 illustrates an alternate source plaque arrangement which is more versatile than plaque arrangements of conventional irradiators and even more versatile than the plaque which is shown in FIGS. 1 and 2. The double plaque illustrated in FIG. 6 has a substantial amount of dummy type material located adjacent to the active portion of the plaque, i.e., adjacent to the source rods 58. The source elements 58 are illustrated by the circles in cross-section in FIG. 6, whereas the dummy materials 57 formed from low density material are illustrated by the X's in cross-section. The use of dummy type materials of low density prevents high parasitic gamma-ray absorption and permits gamma rays to reach targets located on both sides of the source plaque. In the two plaque system of FIGS. 6 and 7 each of the source plaques can be moved parallel to one another so that a variety of overall source plaque configurations can be formed, e.g., the configurations illustrated in FIGS. 6 and 7a. By using double plaques, therefore, it is possible to adjust the effective area of the plaque arrangement over a wide range, which will permit efficient radiation of target materials of various geometries. These figures also illustrate, in graphic fashion, how the radiation dose distribution can vary over a target width when the two plaques are moved with respect to each other. The single track/plaque arrangement of FIG. 1, as well as the means described for moving the plaques along the track, could easily be adopted for use in the double track system.

FIG. 7b illustrates an arrangement of adjacent plaques. For maximum efficiency, these plaques are aligned so that a given source element in one plaque is aligned with the space between adjacent rods in the other plaque. This minimizes source shielding effects.

Baskets 30, in a standard configuration, will be 28 inches or longer in order to accomodate a variety of sizes of product cartons. The size can easily be varied to accommodate products of other sizes. The double source plaque illustrated in FIG. 6 offers the widest possible source width capable of providing irradiation to the widest total effective active area of product; as shown, it can then provide full irradiation to a fully loaded basket.

However, when boxes or cartons smaller than the length of the basket are being irradiated, it is necessary to control the positions of the articles within the basket with appropriate low density spacing materials to accommodate the specific configuration of the source plaque, e.g., to provide irradiation to a narrower effective product area. This will be attained by varying the relative positions of the source rods, e.g., they can be offset as in FIG. 7.

When small boxes or cartons are used with the appropriate low density spacer materials as noted above, the plaques will have a width which will intercept the full target with a small possibility of additional overlap to obtain a desired dose distribution for the target materials. The use of the double plaque concept provides for adjustability of the source plaque(s) width and the amount of radiation dose distribution which will be received by a given product. In this fashion, a standard irradiator can be used in which the baskets can be as long as tolerated by other considerations, e.g., by the flow path and the size of the conveyor ductwork. In other words, the plaque can be adjusted to handle a variety of sized cartons as targets within the baskets.

In operation, a "validation run" will have to be run and the source plaque position is then set so that the sources will have certain limits of motion. Locking devices, which are not illustrated in FIGS. 6 and 7, can then be used to set the source plaque position. This will provide an irradiator which will have been adjusted for maximum efficiency and throughput for a given sized target and for predetermined irradiation dosage levels. This results in a versatile system which can be easily operated by packaging or manufacturing plant personnel.

The baskets are spaced through the conveyor system so as to provide a minimum loss of irradiation space as the conveyor carries the baskets through the irradiator, yet prevents the existence of positions within the irradiator where there will be interference between baskets as they progress in a successive fashion. Such spacing may occasionally result in irradiation streaming outwardly from the plaque which misses the product, in the innermost path or paths, introducing some efficiency to the system. It is therefor desirable to increase the number of passes as much as mechanical tolerances will permit in order to increase the overall system efficiency. All of the ductwork, as well as the four passageways in the irradiation chamber, must necessarily provide adequate clearance for the baskets as they traverse the ductwork and the chamber. The shape of the irradiator is dictated by the need to minimize the interference between baskets when on the conveyor, while simultaneously minimizing total volume of the apparatus to reduce the bouyancy of the chamber and ductwork while underwater. One consequence is that casings 16, when on vertical ductwork, will not be offset as in FIG. 5a, but will instead be centered. This is necessary because the baskets are pivotable, and thus hang vertically at all times. The entire system must also be structurally sound as it must remain water-tight throughout its entire lifespan.

The problem in maintenance and installation which have been discussed above are critical in the present system because if it would not be possible to feed the baskets through the labyrinth of flow paths in the irradiation chamber, there would be no capability for the system to properly irradiate food products.

The operation of this system has been discussed in detail previously and need not be repeated in detail at this time. However, the system works by feeding a plurality of spaced baskets 30 through conveyor ductwork, and along casings 16, starting at entry ductwork 4. The conveyor system traverses horizontally through the entry ductwork, down along angled portion 5a and downwardly along ductwork sections 5b and 27, the latter of which is slightly twisted. The baskets are then conducted along a first horizontal path through ductwork 21, and then downwardly along twisted ductwork portion 20 and into irradiation chamber 13. The baskets are then irradiated along the four passageways in the chamber, i.e., along first, second, third and fourth passageways 32, 34, 36 and 38, each of which is angled at 180° opposite from the preceding passageway. The food products are then conducted upwardly through connecting ductwork portion 19, upwardly through twisted duct work 22, across horizontal ductwork portion 23, and upwardly through twisted duct work portion 24, in a transverse fashion through right angled portion 25, and outwardly through dome 7 via outlet duct work portion 5. It is important that in the first several, e.g., a number of baskets sufficient to fully load the irradiation chamber, dummy products be placed in order to properly attenuate the radiation from source plaque 15 so that none of the products in any of the baskets 30 will receive an undesirably high dosage of irradiation.

As noted previously, this system and irradiation chamber provide a relatively low cost method of integrating food irradiation into present food manufacturing and/or packaging operations. It requires less personnel than previous systems, both to operate and to install, is relatively low cost, and provides a safe installation for irradiation which offers minimal, if any, danger to operational personnel. It is also easy to maintain and install and can be easily repaired by virtue of the unique double chain arrangement so that one half of the system can be repaired, maintained and replaced at any one time while the other half of the conveying system is in fact operational. To this end, chain 46 must have a second shaft 60 attached to it, having a "rollerskate" type wheel 64 positioned along predetermined spaced portions of chain 46. These roller wheels 46 engage opposed parallel inner surfaces of conveyor casing 16, as clearly illustrated in FIG. 5a. O-Rings 43 are provided to position the tubing 16 within ductwork members 62 and 44, which are in turn connected to the remainder of the system in a conventional fashion (not illustrated).

When the system is initially set up, it is possible to simultaneously insert an entire assembly comprising baskets 30, shafts 40, first roller chains 42, chain guides 48, second roller chains 46, shafts 60, and rollerskate wheels 64 into chain conveyor casing 16. Insertion of this portion of the system into the parallel casings can be achieved if two steel snakes are used to insert the entire assembly within the tortuous path defined by parallel casings 16 as described above. The snakes which are used are high tempered steel wires which can be fished through casings 16, from entry ductwork 4 through exit ductwork 5.

The steel wires can be attached to chains 46, through in order to pull the entire assembly outwardly through the ductwork.

Chains 46, guides 48, shafts 60, and wheels 64 are provided in up to double the length (or amount) necessary to extend through all of the ductwork and the underwater portions of the irradiation chamber so that a sufficiently long section of such structure is maintained external to the irradiator, which is in complete repair and readiness for operation. In this fashion, when 50% of the chain guides are withdrawn for inspection, repair and/or maintenance and replacement, the other 50% is operational and the system will not suffer unduly from loss of operational time.

Because the pool is filled with water, means are provided for circulating the water external to the pool through appropriate water purification systems, including demineralizers. This system can be constantly monitored for radioactivity in order that a quick indication would be given in the event that any of the radioactive source elements should develop a leak. In addition, make-up water can be added to the system to provide for evaporative losses from the pool surface. Conventional systems (not shown) could be used for such purposes.

It is also necessary, whenever radioactive source elements are placed beneath the storage plugs at the bottom of the pool, to provide for circulating water through the stored radioactive source elements in order that appropriate cooling may be provided and also to maintain the environmental water around these elements at the proper pH and conductivity in order to minimize corrosion.

Another feature that can comprise part of the irradiation chamber 13 is the use of a pipe connected to each of the irradiation chamber halves 13a and 13b located at the lowest point on the chamber. In this manner, any leakage of water inward into the conveyor casing or irradiation chamber would collect at the lowest point and could be drained off, through a pump to appropriate drains. This also provides an additional monitoring capability for indicating whether or not any leaks are occurring in the overall system.

Suitable attaching means can also be provided for the overall integrated system as each component is added to the irradiation chamber when it is being installed in the irradiation pool. These can be, e.g., lifting eyes which would be appropriately designed so as to minimize any stress on components or the overall irradiator assembly.

When installing the assembly, the pool is expected to be empty of water, and the irradiation chamber would be lowered first into the pool and then the additional conveyor tube sections bolted in place while the overall assembly is made.

It at any time it becomes necessary to remove the entire irradiator assembly from the pool while it is filled, the overall assembly would first be flooded before unbolting it from the floor. In this manner, it could be raised by an appropriate hoist from the pool without buoyancy effects, and as it was raised from the pool the drain ports on the irradiation chamber could allow water to be drained from the overall assembly. When, eventually, the overall irradiation assembly is lifted free of the pool, it would have also been completely drained of water. If it is then to be put back into the pool while the pool is still filled with water, the ports could be left open and the assembly flooded again as it proceeds downwardly into the pool until it is bolted in position. At that time, the irradiator assemby could be pumped dry.

The present invention is also advantageous in that it provides an additional protective barrier to prevent the food product being irradiated from possible food product contamination in the very unlikely event that a radioactive source element develops a leak. This is achieved by positioning all product to the irradiator chamber and source plaque via a watertight conveyor ductwork system and watertight irradiation chamber. This is superior to all-type irradiation systems, which depend primarily upon double encapulation of the radioactive source elements, which also exists in the present invention. However, conventional systems raise the source plaque into an irradiation all, which may or may not have any barriers, other than air spacing, between the radioactive source elements and food cartons.

It is obvious to those of ordinary skill in the art that there are other features and embodiments of the present invention which would be within the scope of those of ordinary skill in the art, and this invention is intended to cover such other embodiments.

What is claimed is:

1. A packing house irradiator for irradiating products at desired radiation dosage levels, said irradiator comprising:
   (a) a substantially watertight enclosure, said enclosure comprising means for receiving water;
   (b) an irradiation chamber for providing predetermined radiation dosages to products moved through said chamber, said irradiation chamber being positioned completely underwater when said enclosure is filled with said water, both during operation and shut-down periods of said irradiator, said irradiation chamber comprising a central section and at least two additional chamber sections;
   (c) a conveyor for continuously guiding said products into said enclosure, through said chamber, and outwardly from said enclosure; and
   (d) a source of radiation, said radiation source being positionable within said irradiation chamber, said central section comprising means for housing said radiation source, a first one of said additional sections comprising a substantially enclosed vertical path for guiding said products on said conveyor downwardly within said chamber, and a second one of said additional sections comprising a substantially enclosed vertical path for guiding said products on said conveyor upwardly within said irradiation chamber, wherein each of said additional sections has a cross-section which is substantially less than the cross section of said chamber, wherein said conveyor and said additional sections comprise means for conducting said products past said radiation source, said sections being positioned on opposite sides of said radiation source and comprising means for isolating said products from contact with said radiation source and with any water located within said enclosure.

2. A packing house irradiator in accordance with claim 1 wherein said enclosure copmrises at least one generally vertical wall.

3. A packing house irradiator in accordance with claim 2 wherein said enclosure further comprises a substantially hemispherical dome which is attached to a top portion of said at least one generally vertically arranged wall.

4. A packing house irradiator in accordance with claim 3, further comprising a base attached to a bottom edge of said at least one wall, each said wall and said base defining a watertight pool.

5. A packing house irradiator in accordance with claim 2 wherein said wall is substantially cylindrical.

6. A packing house irradiator in accordance with claim 2 wherein there are four walls assembled in a generally rectangular fashion.

7. A packing house irradiator in accordance with claim 4 wherein said base and said at least one wall are formed from concrete.

8. A packing house irradiator in accordance with claim 4 wherein said dome includes at least one transparent observation port.

9. A packing house irradiator in accordance with claim 4 further comprising at least one removable plug in said base, each said at least one plugs closing a radiation source storage compartment located under said base, each compartment being adapted to hold at least one radiation source element.

10. A packing house irradiator in accordance with claim 4 further comprising at least one support for said irradiation chamber, each said support being securely connected to said pool base and to a bottom of said irradiation chamber to fixedly secure said chamber within said pool.

11. A packing house irradiator in accordance with claim 1 wherein a substantial portion of said pool is filled with water.

12. A packing house irradiator in accordance with claim 1 wherein there are five irradiation chamber sections, a central section for housing said radiation source, and four additional chamber sections, each of said additional sections being substantially vertically arranged, wherein first and third additional sections comprise paths for guiding a product conveyor downwardly within said chamber, and wherein second and fourth sections comprise paths for guiding said product conveyor upwardly within said irradiation chamber.

13. A packing house irradiator in accordance with claim 12 wherein said second and third sections are located directly adjacent to said source.

14. A packing house irradiator in accordance with claim 12 wherein each of said chamber sections is substantially vertically arranged within said chamber.

15. A packing house irradiator in accordance with claim 1 wherein said radiation source comprises at least one moveable plaque for holding radioactive material.

16. A packing house irradiator in accordance with claim 15 wherein said radioactive material comprises a plurality of generally vertically arranged rods.

17. A packing house irradiator in accordance with claim 16 wherein there are at least two plaques holding said rods.

18. A packing house irradiator in accordance with claim 17 wherein each of said plaques further comprises a plurality of non-radioactive spacer elements of low density material.

19. A packing house irradiator in accordance with claim 18 further comprising means for moving the plaques with respect to each other to adjust the position of the radioactive rods in each plaque with respect to each other when said plaques are positioned within said radiation chamber.

20. A packing house irradiator in accordance with claim 15 wherein said irradiation chamber is positioned within approximately one-half of said pool area, said irradiator further comprising means for moving said plaque between said irradiation chamber and said pool.

21. A packing house irradiator in accordance with claim 20 wherein said irradiation chamber comprises two equal height chamber members defining an adjustable slot between them for permitting each said plaque to be moved between said chamber and said pool.

22. A packing house irradiator in accordance with claim 15 further comprising means for oscillating said plaque in at least one of said vertical and horizontal directions.

23. A packing house irradiator in accordance with claim 1, wherein said conveyor is attached both to ductwork which extends through a dome forming a top portion of said substantially watertight enclosure and to an interior surface of said irradiation chamber.

24. A packing house irradiator in accordance with claim 23, said ductwork extending from outside said dome to said irradiation chamber, said conveyor being attached to an exterior surface of said ductwork and to an interior surface of said irradiation chamber.

25. A packing house irradiator in accordance with claim 23 wherein said ductwork is watertight.

26. A packing house irradiator in accordance with claim 23, said conveyor comprising means for conducting a plurality of product holding baskets through said pool and said irradiation chamber.

27. A packing house irradiator in accordance with claim 26, said baskets being spaced from each other along said conveyor, each basket having a shaft extending outwardly therefrom.

28. A packing house irradiator in accordance with claim 27, said conveyor comprising at least one continuous chain and means for attaching said chain to said basket shafts.

29. A packing house irradiator in accordance with claim 28, said conveyor further comprising a generally rectangular casing which receives said shaft and a roller wheel abutting opposed interior walls of said casing.

30. A packing house irradiator in accordance with claim 28, further comprising a plurality of spaced chain guides, each of said guides comprising a low coefficient of friction material and comprising a central recess within which said chain is moveably positioned.

31. A packing house irradiator in accordance with claim 9, further comprising means for detecting the presence of an undesirable amount of liquid within said rectangular casing, said detecting means comprising a flexible tubing fluidically connected to the interior of said casing and a pressure gauge connected to a free end of said tubing.

32. A packing house irradiator in accordance with claim 1 further comprising continuous ductwork for connecting the exterior of said enclosure with said radiation chamber, said ductwork comprising a plurality of connected horizontal and vertical duct sections.

33. A packing house irradiator in accordance with claim 32 further comprising a plurality of right-angled duct sections and a plurality of twisted, generally vertically arranged duct sections, said ductwork comprising means for attenuating radiation from said radiation source.

34. A packing house irradiator in accordance with claim 1 wherein said irradiator and a substantial portion of said enclosure are buried underground.

35. A packing house irradiator in accordance with claim 12, wherein said first and fourth irradiation chamber sections are positioned, respectively, along the exterior of said second and third irradiation chamber sections.

36. An irradiation chamber in accordance with claim 12, wherein each of said chamber sections comprises a substantially enclosed rectangular section, said chamber sections comprising substantially discrete enclosed zones.

37. Apparatus in accordance with claim 1, wherein said conveyor is positioned within each of said additional sections, said conveyor comprising a substantially continuous chain and a plurality of baskets attached to said chain, said chain being positioned in a casing which is in turn attached to interior surfaces of said additional sections.

38. A packing house irradiator in accordance with claim 1, wherein said enclosure is at least partially filled with water.

39. A packing house irradiator in accordance with claim 1, wherein said products comprise food products.

40. A packing house irradiator in accordance with claim 30, wherein said means for moving each said plaque between said irradiation chamber and said pool comprise means for effectively terminating radiation of any product within said irradiation chamber.

41. A packing house irradiator in accordance with claim 30, wherein said spaced chain guides are detachably connected to said casing.

42. A packing house irradiator in accordance with claim 29, further comprising a plurality of roller wheels which engage opposed inner walls of said casing, said roller wheels being rotatable but remaining stationary with respect to said movable roller chain.

43. A packing house irradiator in accordance with claim 32 wherein said ductwork includes a substantially horizontal section adapted to extend through a dome of said packing house irradiator, a downwardly extending section attached to said horizontal section and extending towards said irradiation chamber, a twisted section having a first end attached to said downwardly extending section and a second end attached to an entrance of said irradiation chamber, an additional twisted section attached at one end to an exit of said irradiation chamber for guiding product upwardly from said irradiation chamber, an additional upwardly extending section attached to a second end of said additional twisted section, and an additional horizontally extending section attached to said additional upwardly extending section and extending outwardly through said dome.

44. A device for holding a plurality of rods of radioactive source material, said device comprising at least two plaques movable with respect to each other, each of said plaques comprising a frame for holding a plurality of said rods in a generally vertical fashion, said device further comprising means for moving said plaques in opposite, substantially horizontal directions, each of said plaques further comprising a plurality of non-radioactive, low density spacer elements positioned within said frame, said plaques being movable between a first, fully overlapped position in which the source rods in each of said frames are offset from each other, and a second, full width position, in which the source rods in said frames are adjacent to each other.

45. A device for holding a plurality of rods of radioactive source material in accordance with claim 44, said frame including at least two horizontal frame members with aligned openings for receiving said rods.

46. A device for holding a plurality of rods of radioactive source material in accordance with claim 44, wherein each plaque has at least two sections, one section retaining said rods and a second section retaining said spacer elements.

47. A device for holding a plurality of rods of radioactive source material in accordance with claim 46, wherein said plaques have equal widths, and wherein said rod sections in said plaques are offset from each other when said plaques are positioned adjacent to each other in said overlapped position.

48. A device for holding a plurality of rods of radioactive source material in accordance with claim 47, wherein said rod sections are moved adjacent to each other when said plaques are moved.

49. A device for holding a plurality of rods in accordance with claim 44, further comprising means for moving said plaques, said moving means including parallel pairs of spaced tracks.

50. A device for holding a plurality of rods in accordance with claim 44, said device being positioned in a pool of water, said device including means for moving both of said plaques, from a radiation position between at least two enclosed guides for conducting products to be irradiated into a non-radiation position within said pool and spaced away from said guides.

51. A device for holding a plurality of rods in accordance with claim 44, wherein each of said plaques comprises a first section including only said rods and a second, adjacent section including only said spacer elements.

52. A packing house irradiator for irradiating products at predetermined radiation dosage levels, said irradiator comprising a substantially watertight enclosure at least partially filled with water, an irradiation chamber positioned in said water, means for continuously conveying products to be irradiated along a predetermined path into said enclosure, through said radiation chamber, and outwardly from the enclosure, a radiation source in said chamber, means for preventing said products from contacting said water and said source when in said enclosure, said preventing means being positioned along opposite sides of said radiation source, and means for moving said radiation source from said chamber into said water and away from said products.

53. An irradiator in accordance with claim 52, wherein said preventing means comprise discrete, substantially vertical chamber sections, wherein the cross-section of said chamber is less than that of said enclosure, the cross-section of each chamber section being less than the cross-section of said chamber, wherein an equal number of said vertical chamber sections are positioned along opposite sides of said radiation source.

* * * * *

UNITED STATES PATENT AND TRADEMARK OFFICE
CERTIFICATE OF CORRECTION

PATENT NO. : 4,760,264

DATED : July 26, 1988

INVENTOR(S) : Lawrence G. BARRETT

It is certified that error appears in the above-identified patent and that said Letters Patent is hereby corrected as shown below: ON TITLE PAGE:

In the Abstract, at line 5, change "a" to ---an---;
column 7, line 1, change "function" to ---friction---;
column 11, line 44, delete "a" after "more";
column 12, line 26, change "busing" to ---bushing---;
column 14, line 24, change "illustrated" to ---illustrated)---;
column 16, line 18, change "accomodate" to ---accommodate---;
column 19, line 6, change "It" to ---If--- before "at";
column 19, line 34, change "all" to ---cell---;
column 20, line 12 (claim 2, line 2), change "copmrises" to ---comprises---;
column 21, line 65 (claim 31, line 2), change "9" to ---29---; and
column 22, line 41 (claim 40, line 2), change "30" to ---20---.

Signed and Sealed this

Twenty-second Day of October, 1991

Attest:

HARRY F. MANBECK, JR.

Attesting Officer

Commissioner of Patents and Trademarks